Aug. 6, 1974 W. H. LONG Re. 28,100

TRAFFIC SIGNAL REMOTE CONTROL SYSTEM

Filed March Original 16, 1967 5 Sheets-Sheet 1

INVENTOR
WILLIAM H. LONG
BY Allen E. Bobney
ATTORNEY

TRAFFIC SIGNAL REMOTE CONTROL SYSTEM

Filed March Original 16, 1967 5 Sheets-Sheet 2

INVENTOR
WILLIAM H. LONG
BY Allen E. Bothney
ATTORNEY

TRAFFIC SIGNAL REMOTE CONTROL SYSTEM

Filed March Original 16, 1967 5 Sheets-Sheet 3

INVENTOR
WILLIAM H. LONG
BY Allen E. Bohney
ATTORNEY

TRAFFIC SIGNAL REMOTE CONTROL SYSTEM

Filed March Original 16, 1967 5 Sheets-Sheet 4

INVENTOR
WILLIAM H. LONG
BY Allen E. Bothey
ATTORNEY

TRAFFIC SIGNAL REMOTE CONTROL SYSTEM

Filed March Original 16, 1967 5 Sheets-Sheet 5

PRIOR ART DEVICE

PRIOR ART DEVICE

United States Patent Office

Re. 28,100
Reissued Aug. 6, 1974

28,100

TRAFFIC SIGNAL REMOTE CONTROL SYSTEM

William H. Long, P.O. Box 33427, Woodbury, St. Paul, Minn. 55133

Original No. 3,550,078, dated Dec. 22, 1970, Ser. No. 623,765, Mar. 16, 1967. Application for reissue July 13, 1973, Ser. No. 379,070
Int. Cl. G08g *1/07*
U.S. Cl. 340—34 16 Claims

Matter enclosed in heavy brackets [ ] appears in the original patent but forms no part of this reissue specification; matter printed in italics indicates the additions made by reissue.

ABSTRACT OF THE DISCLOSURE

A system for remotely controlling traffic signals wherein a signal transmitted from an emergency vehicle causes a traffic light signal controller mounted at an intersection to operate in a remotely controlled mode to control a traffic light signaling operation in a selected phase of operation in response to the detected direction of approach of the emergency vehicle and the sensed phase of the traffic light at the time the approach of the emergency vehicle is detected. The detector preferably includes a light sensitive communications receiver which is capable of distinguishing a predetermined light communication signal having pulses of relatively sharp rise time and of a predetermined frequency, from steady state ambient light. This preferred receiver combines a photovoltaic detector having a fast response time in parallel with an inductance coil. The inductance value of the coil is chosen in relation to the photovoltaic detector capacitance to provide a resonant circuit response to a said predetermined light communication signal and, in the absence of a sharply varying light pulse, to cause the coil to act as a DC short circuit. *A transmitter for providing such a light communications signal preferably includes a chamber having a light-transmissive wall, an electronic flash lamp mounted in the chamber having electrical conductors adapted to be connected to be energized, and a light-transmissive electrically-insulating fluid in the chamber to contact the electrical conductors of the electronic flash lamp.*

The present invention relates in general to systems for controlling vehicular traffic at street and highway intersections, and more particularly relates to means for remotely operating and effecting such traffic control systems.

Emergency vehicles, such as fire-fighting apparatus, ambulances, and police cars, generally have the right to cross or pass through signal-controlled intersections even though the Stop signals are set against the direction in which they are traveling. As is well known, in such instances these emergency vehicles depend for their protection on the sound of a siren, horn, bell or the like. However, due to impaired hearing, inattention, noise conditions, etc., serious accidents have occurred at these intersections due to the fact that drivers on the cross street see a Go signal indication and, in response thereto, proceed into the intersection and in front of the emergency vehicle. Furthermore, today's highways and city streets are becoming increasingly congested with automobile, truck and bus traffic. The right to occupy road space is being further extended, which means congestion will grow. In turn, this means the difficulty of movement of emergency vehicles through traffic will increase.

The present invention provides a satisfactory solution to this problem for it enables police cars, fire trucks and other emergency vehicles to proceed through intersections without having to run a red light to do so. More particularly, by means of the present invention, an emergency vehicle is supplied with an energy-radiating element and detectors are provided at the intersections so that when the vehicle approaches an intersection, the detectors will be actuated by the radiator to cause the traffic signal to be changed to indicate Stop (or Caution) in the direction of the cross street and Go in the direction of travel.

In the present invention, optical energy, either visible or infra-red light, is contemplated and, as the emergency vehicle approaches an intersection, the light is picked up by the receiver detector mounted in the vicinity of the intersection. The detector, in turn, commands circuitry in the signal controller to flash a green light. The vehicle then proceeds through the intersection unencumbered by other vehicles after which the signal controller returns the system to its normal mode of operation.

The present invention [has] *involves a novel combination having* a number of unique features associated with it that significantly and materially distinguishes it over the prior art which is typified, for example, by U.S. Pat. 2,355,607 entitled "Control System" by J. O'D. Shepherd, issued Aug. 15, 1944; *U.S. Pat. 2,173,596 entitled "Traffic Control System" by J. O'D Shepherd, issued Sept. 19, 1939; U.S. Pat. 2,203,871 entitled "Radio Traffic Control" by W. R. Koch, issued June 11, 1940; U.S. Pat. 3,114,127 entitled "Traffic Light Controller" by J. E. Ramsey, issued Dec. 10, 1963; U.S. Pat. 3,257,641 entitled "Emergency Traffic Control Sytem" by P. C. Campana et al., issued June 21, 1966; U.S. Pat. 3,278,895 entitled "Automobile Signalling" by C. E. Pfund, issued Oct. 11, 1966; British Pat. 478,924 entitled "Improvements in or relating to Devices for the Reception of Signals Transmitted to Moving Motor Cars" by E. Falkenthal et al., accepted Jan. 27, 1938; and Swiss Pat. 310,373 entitled "Signaluebertragungsanlage mit Lichtblitzen als Uebertragungsmittel" by F. Fruengel, published Dec. 16, 1955.* More specifically, considering traffic control systems that are in use today, a signal controller is mounted at every intersection whereat traffic light signals are mounted and maintained, the signal controller being nothing more than the electromechanical network that controls in a phased cyclic sequence, the entire signaling operation, including the duration of traffic signals and the maintenance of synchronization with other traffic signals at other intersections in the area.

An early, but nevertheless typical, signal controller is shown and described in U.S. Pat. 2,173,596 entitled "Traffic Control System" by J. O'D Shepherd, issued Sept. 19, 1939.

While such signal controllers are designed to operate automatically, they also include a manual control which permits a policeman or fireman, for example, to manually control the durations of these traffic signals. Thus, in this way, particular signals can, in one direction or the other, be kept for longer or shorter periods of time, as [described] *desired*, and upon relinquishment of the manual control, the traffic signals are returned to their former synchronization with traffic signals at nearby intersections.

One of the important shortcomings of earlier means for remotely operating traffic control systems is that they pre-empted the signal controller at an intersection in the sense that what they basically did was to substitute one signal controller for another or to override the signal controller. Furthermore, these prior-art means generally failed to take into consideration many ambient conditions that might render them useless or otherwise adversely affect them, with the result that their reliability was oftentimes subject to question. It is probably for these reasons that such earlier means never met with any degree of commercial success.

The present invention overcomes these earlier disadvantages by providing means for remotely operating a traffic control system that does not pre-empt the signal controller as previously described but, rather, remotely activates it so as to select a particular signal [control.] *phase.* Thus, an embodiment of the present invention is capable of controlling the operation of traffic signals in the same manner and just as if a policeman or fireman were standing at a signal-controller box and operating its manual control. Stated differently, an embodiment of the present invention takes the place of the policeman or fireman, and it does so at a distance from the box, that is to say, remotely. In addition, the present invention has greatly improved the reliability of such remotely operated systems so that they can be employed with far greater assurance on the part of the user. For example, embodiments of the present invention substantially eliminate ambient optical interference problems, and they also provide against problems that may be introduced by traffic conditions, as where the signals radiated from the emergency vehicle toward the intersection are briefly blocked by the vehicles ahead.

It is, therefore, an object of the present invention to provide means by which selected vehicles, such as emergency vehicles, may safely move without interruption through street and highway intersections.

It is another object of the present invention to provide a means for remotely controlling the traffic signals at intersections.

It is an additional object of the present invention to provide apparatus by means of which the operators of vehicles can remotely communicate with traffic-control systems and remotely control the traffic signals thereof.

It is a further object of the present invention to provide the means for instant control of a traffic signal to permit an emergency vehicle to pass through an intersection in a normal manner.

It is still another object of the present invention to provide highly reliable and relatively inexpensive apparatus that can be used in combination with existing traffic-control systems to remotely control the operation of the traffic-light signals thereof.

Finally, it is an object of the present invention to provide a system for selectively controlling the operation of traffic-light signals without disrupting the master synchronization of these signals.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
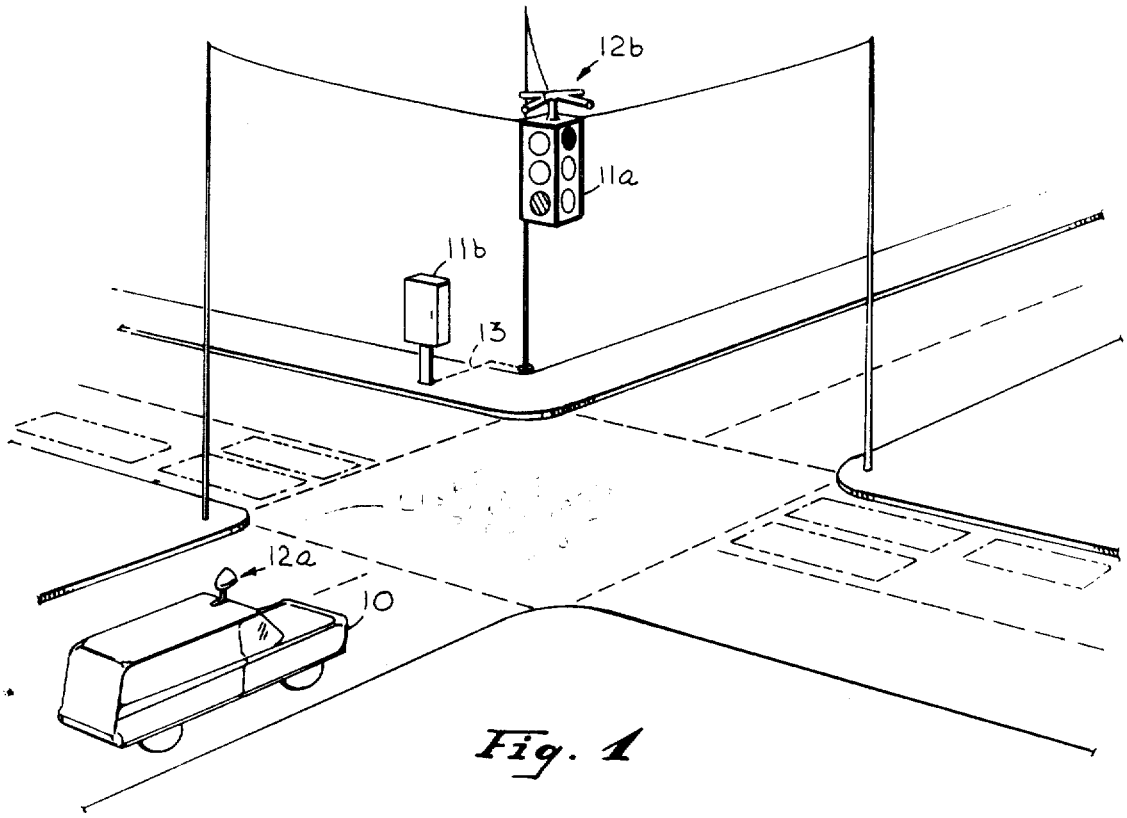
FIG. 1 is a street scene at an intersection, by means of which the broad aspects or features of the present invention may be presented.

For a consideration of the invention in detail, reference is now made to the drawings wherein like or similar parts or elements are given like or similar designations throughout the several figures. FIG. 1 illustrates a street scene at a traffic intersection whereat an embodiment of the present invention is in operation and shows an emergency vehicle 10, on which the transmitter portion of the embodiment is mounted, approaching the intersection whereat the receiver portion of the embodiment is mounted. In turn, the receiver operates in combination with a traffic control system made up of traffic lights 11a that are under the control of a signal controller or traffic control box 11b. The entire transmitter portion is represented by the lamp assembly protruding above the roof of the vehicle and is generally designated 12a. Similarly, the entire receiver portion is represented by its detector element which, in the figure, is mounted above the traffic lights and generally designated 12b. It should be mentioned that the detector element itself is only a small portion of the receiver section which is preferably mounted or located in control box 11b, the link between the detector and the rest of the receiver being indicated by the broken line 13. It should further be mentioned that the detector element need not be mounted above or below the traffic lights but may, instead, be mounted at any place in the intersection where it can command a view of the streets leading into the intersection. In this regard, it will be pointed out later but nevertheless should be recognized at this point that the detector device shown in the figure is really made up of as many detector elements as there are streets leading into the intersection and that they are respectively oriented so as to be in a position to receive the signals transmitted from an emergency vehicle traveling toward the intersection in one or the other of these streets. As previously mentioned, when such a signal is detected, the condition of the lights are changed so that the vehicle can pass through the intersection with the green light in its favor.

Figure 2:
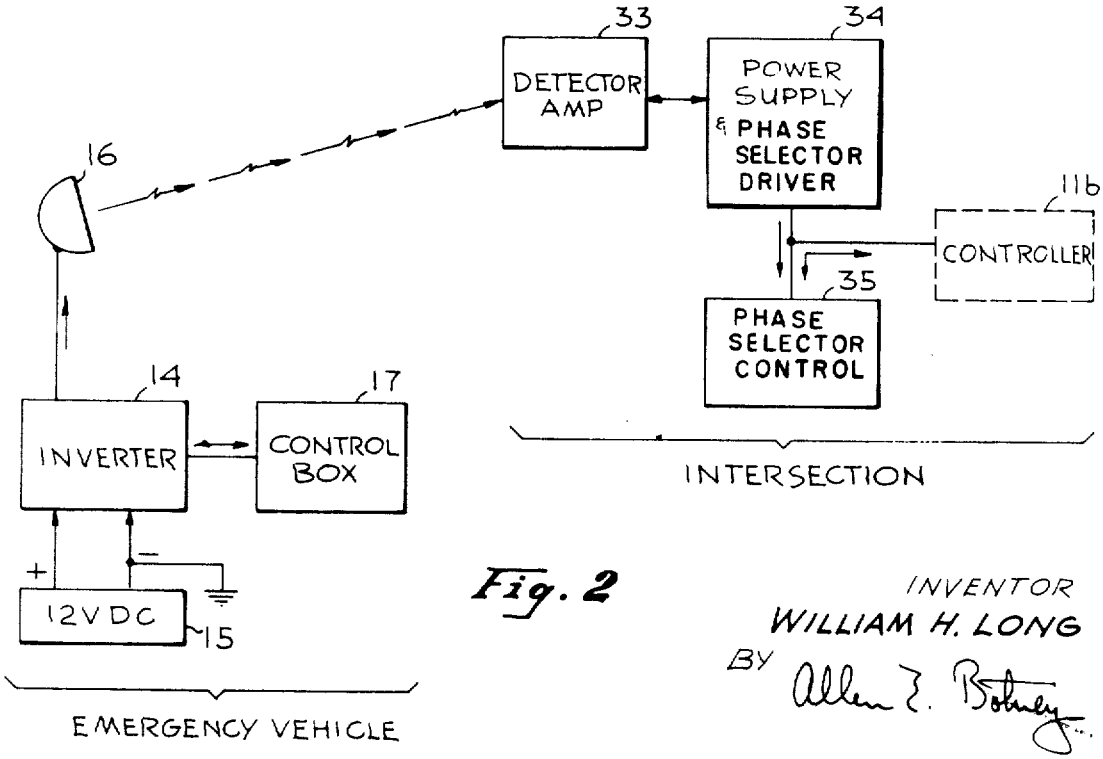
FIG. 2 is a block diagram that illustrates the basic units in any embodiment of the present invention.

The basic transmitter and receiver units in any embodiment of the present invention are illustrated in FIG. 2 and as indicated therein, for the transmitter this would include an inverter 14 coupled between a source of direct-current voltage 15 and a lamp assembly 16, the inverter also being connected to a control box 17. Voltage source 15 is nothing more than the vehicle voltage, such as the 12 volt battery usually carried in a motor vehicle, and the function of inverter 14 is to convert this vehicle battery voltage to an alternating-current voltage, amplify it, and then rectify it to produce a relatively high direct-current voltage, such as 2,000 volts, at one outlet and a relatively low direct-current voltage, such as 200 volts, at another outlet. As will be seen later, the high DC voltage (2,000 volts) is used to discharge the lamp in lamp assembly 16 which requires a high voltage across its anode-cathode elements. The inverter is a standard item and, hence, nothing further need be said about it. As for lamp assembly 16, its function is to send out pulsed beams of high-intensity light that includes either visible light or radiation in the infrared region, or both. With respect to control box 17, suffice it to say that it comprises nothing more than a switch, such as a toggle switch, and an indicator light. As can easily be guessed, the purpose of the switch is to turn the transmitter either On or Off, while the indicator light, as its name implies, indicates whether the transmitter is in an On or an Off condition.

Figure 3:
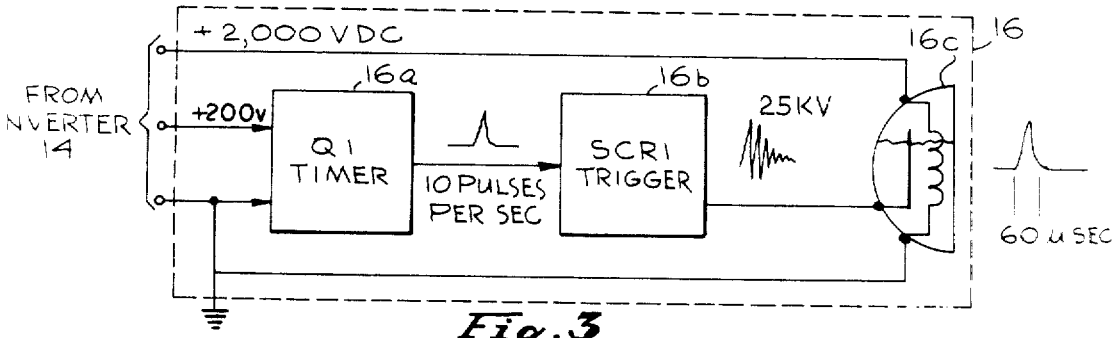
FIG. 3 is a block diagram that illustrates the lamp assembly of FIG. 2 in somewhat greater detail.

Lamp assembly 16 is shown in greater detail in FIG. 3 to which reference is now made and, as shown therein, it basically includes a timer circuit 16a, a trigger circuit 16b, and a lamp 16c, the trigger circuit being connected between the lamp and the timer circuit which, in turn, is connected to the previously mentioned inverter. More specifically, with respect to the voltages produced by the inverter, the low-voltage lines (200 v. DC) are connected directly to the timer circuit whereas the high-voltage lines (2,000 v. DC) are connected directly to the lamp, as is shown in the figure. The function of the timer circuit is to produce voltage pulses at a predetermined pulse rate, such as, for example, ten pulses per second, and, toward this end, the timer is free-running. The pulses produced by this circuit are preferably sharp voltage spikes. The function of the trigger circuit, on the other hand, is to produce a high-voltage pulse in response to each spiked pulse, preferably a radio-frequency type of pulse. As will be recognized, the purpose of the RF pulse is to partially break down the medium between the anode and cathode elements in the lamp, thereby permitting the high voltage (2,000 v. DC) difference between these elements to produce the desired flash. A 25 kilovolt RF pulse is desirable to do the job, but any voltage that is high enough to produce the flash is all right. The technique of triggering the lamp is conventional in that it is very much the same as the technique for triggering photographic flash lamps.

Finally, for optimum results, lamp 16c should be able to produce a high intensity beam of short duration. By way of example, a flash or light pulse of approximately 60 microseconds duration and of 750,000 candlepower intensity has been found to be producible and satisfactory. It should be mentioned, however, that the candlepower figure specified above is the calculated candlepower. A lamp 16c suitable for use in an embodiment of the present invention [is fuly], *as* described in U.S. Pat. 2,936,387 entitled "Stroboscope Illumination" by H. M. Steele, Jr., et al., issued May 10, 1960[.] *, includes a chamber having a light-transmissive wall; an electronic flash lamp mounted in said chamber having electrical conductors adapted to be connected to be energized; and a light-transmisive electrically-insulating fluid in said chamber to contact said electrical conductors of said electronic flash lamp.*

Figure 8:
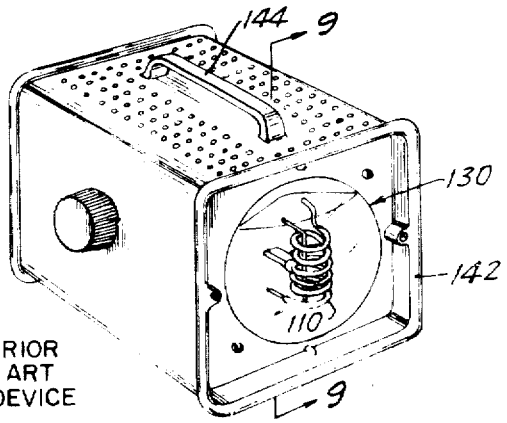
*FIG. 8 is identical (except for reference characters) to FIG. 1 in U.S. Pat. 2,936,387, which is referred to hereinafter, and is presented herein for convenience.*
Figure 9:
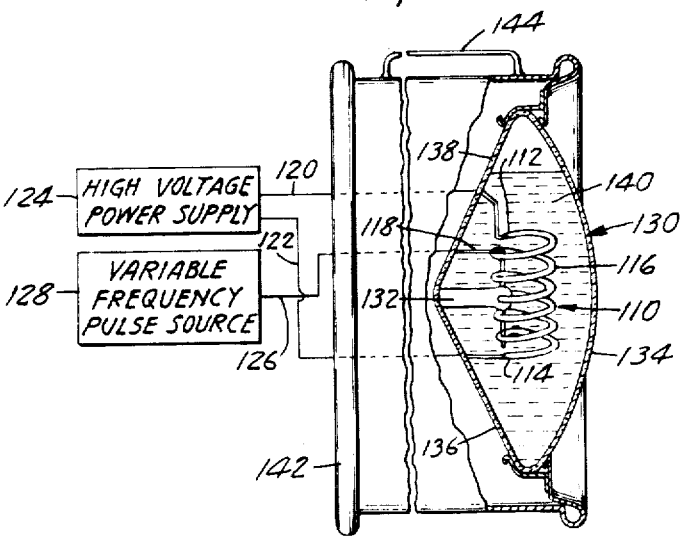
*FIG. 9 is identical (except for reference characters) to FIG. 2 in said U.S. Pat. 2,936,387 and is presented herein for convenience.*

*Referring now to FIGS. 8 and 9 there is shown a flash tube, i.e. an electronic flash lamp 110. The lamp 110 may take various forms, for example, the lamp may be a type manufactured by the General Electric Company and designated FT 220, having an anode 112 and a cathode 114 sealed in a helical glass tube 116. A trigger electrode 118 is positioned to contact a wall of the glass tube 116. The anode 112 and the cathode 114 are connected by conductors 120 and 122, respectively, to a high-voltage power supply 124.*

*The trigger electrode 118 of the lamp 110 is connected through a conductor 126 to a variable-frequency pulse source 128 which provides high-voltage pulses of variable frequency.*

*The lamp 110 is centrally supported in a chamber 130 by a bracket 132. The bracket 132, which serves to support the lamp 110 within the chamber 130, may be formed of glass, ceramic, or various other materials which have good insulating characteristics. The chamber 130 is formed by a light-transmissive concave wall 134 of uniform thickness which is integral with a uniform concave wall 136 having a reflective coating 138 thereon. The chamber 138 may for example be entirely of glass with the coating 138 of metal applied by evaporation to the wall 136.*

*A light-transmissive liquid partially fills the chamber 130 so that the lamp 110 is contacted by the liquid regardless of the position in which the apparatus is placed. The air space or an evacuated space in the chamber allows for volumetric changes by the liquid 140. The liquid 140 is a high dielectric substance and therefore insulates the electrical conductors in the chamber 130. Additionally, it is advantageous if the liquid 140 is a low-viscosity liquid, for example of 50 to 500 centistokes, and has good optical qualities. An example of one liquid which has been found satisfactory for use in the apparatus of the present invention is silicone oil. The low viscosity of a liquid permits rapid convection flow and promotes a high and uniform rate of heat dissipation.*

*The chamber 130 containing the liquid 140 and the lamp 110 is mounted in a housing 142 to afford protection and convenient handling for the apparatus. A handle 144 is incorporated in the housing 142. The power supply 124 and the pulse source 128 may be enclosed by the housing 142 or separately housed from the lamp unit.*

*In operating the apparatus of the present invention, the unit is positioned so that the light from the lamp 110 passes through the wall 134. The high-voltage power supply 124 is then energized to apply a high voltage to the column of gas in the tube 116 between the anode 112 and the cathode 114. Next, the variable-frequency pulse source 128 is energized to apply high voltage pulses to the electrode 118 through the conductor 126, thereby causing the gas in the tube 116 to be repeatedly ionized resulting in electrical discharges between the anode 112 and the cathode 114. The electrical discharges produce light flashes of a high intensity which pass through the wall 134.*

*During each electrical discharge between the anode 112 and the cathode 114 a hot spot is formed in the glass tube 116, the cumulative effect of which would normally destroy a flash lamp used to provide stroboscopic light. However, the liquid 140 contacting the glass tube 116 distributes the heat adequately to preserve the lamp. The distribution of the heat produced by the electrical discharge in the lamp thus prolongs the life of the unit even at relatively high frequencies.*

Figure 4:
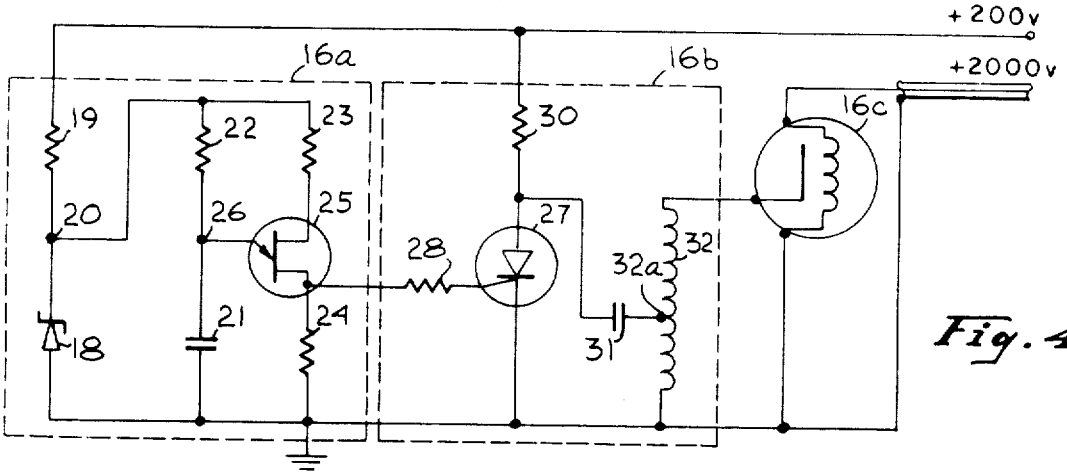
FIG. 4 is a schematic circuit diagram of the lamp assembly and is arranged to correspond with the block diagram thereof in FIG. 3.

Lamp assembly 16 is presented in still greater detail in FIG. 4 wherein the circuits thereof are schematically shown, timer circuit 16a [comprises] *comprising* a Zener diode 18 connected between ground and one end of a resistor 19, the junction between elements 18 and 19 being designated 20. The other end of resistor 19 is connected to the low voltage source (200 v. DC) from the inerter. The [inner] *timer* circuit additionally includes a capacitor 21, resistors 22, 23 and 24 and a Unijunction transistor 25, capacitor 21 being connected between ground and one end of resistor 22 at junction 26, the other end of resistor 22 being connected to junction 20. One end of resistor 23 is likewise connected to junction 20 and one end of resistor 24 is grounded, the other ends of these latter resistors respectively being connected to different base elements of the Unijunction transistor 25. The emitter element of the Unijunction transistor 25 is connected directly to junction 26 as is shown in FIG. 4. As for trigger circuit 16b, it includes a silicon controlled rectifier 27 and a pair of resistors respectively designated 28 and 30, the cathode of the rectifier being grounded, the gate element of the rectifier being coupled through resistor 28 to the transistor end of resistor 24, and the rectifier's anode being connected to the low voltage source (200 v. DC) through resistor 30. Finally, the trigger circuit includes a capacitor 31 and an auto transformer 32 that is tapped at point 32a, the capacitor 31 being connected between tap 32a and the rectifier end of resistor 30. The ends of auto transformer 32 are connected between ground and the control grid of lamp 16c whose filament structure, as is shown in the figure, is connected between ground and the aforesaid high voltage source (2,000 v. DC).

Considering the operation of the FIG. 4 circuitry, Zener diode 18 and resistor 19 together act as a voltage regulator and thereby provide a stabilized voltage at junction 20. Capacitor 21 charges toward this stabilized voltage through resistor 22, until it reaches the breakover point of the Unijunction transistor 25, at which point the capacitor 21 discharges through resistor 24 via the Unijunction transistor 25. When this discharge occurs, a voltage spike appears across resistor 24 which is applied to the gate element of silicon controlled rectifier 27. In response thereto, the rectifier fires and capacitor 31, which has earlier charged through resistor 30, now discharges through the rectifier and the lower portion of auto transformer 32, namely, the portion between ground and terminal 32a. It will be recognized by those skilled in the art that because this discharge loop contains both capacitance and inductance, a very high voltage oscillation is produced which is applied by the auto transformer to lamp 16c. The oscillation is quickly damped, but it does have the effect of partially ionizing the medium within the lamp, thereby making it possible for the high DC voltage applied to the lamp to produce the flash that results in the radiation of a brief but highly intense light beam. As previously mentioned, the timer circuit is free-running so that the described operation [in] *is* repetitive, the circuits preferably being designed so that about 10 such flashes are obtained per second.

As indicated earlier during the discussion of FIG. 1, the pulsed beams of light are transmitted to the receiver at the intersection and, as is shown in FIG. 2, the receiver basically includes a detector unit 33, a power supply and phase selector driver unit 34, and a phase selector control unit 35, the power supply and phase selector driver unit being connected between the detector and phase selector control units. FIG. 2 also shows a controller unit connected to the junction between units 34 and 35, but it should be mentioned that the controller unit is not part of the invention. More specifically, its function is to control the traffic signals at an intersection and the function of an embodiment of the invention is to remotely control said controller so as to, in turn, remotely control the traffic signals. Thus, the controller unit of FIG. 2 is identical with the traffic control box designated 11b in FIG. 1 and for this reason the controller unit is likewise designated 11b.

Returning now to detector unit 33, its function is to receive pulsed beams of light exclusive of ambient light conditions and, in response thereto, to produce corresponding electrical signals that are later amplified. The function of phase selector driver unit 34 is to determine whether the incoming signals are indeed the signals emanating from lamp 16c on the emergency vehicle, and when it does so decide it triggers or initiates the operation of the phase selector control unit 35. Thus, phase selector driver unit 34 is basically a recognition or discriminator circuit that minimizes the possibility of triggering by false signals. As for phase selector control unit 35, its function, when triggered into operation by the phase selector driver unit, is to determine the existent condition of the traffic signals at the time the system of the present invention goes into operation and to take the necessary and appropriate action to cause and insure the display of a green light in the direction of the vehicle of concern. As previously mentioned, this is done by affecting the manual control in controller unit 11b in the same manner as if someone were standing there doing it.

Figure 5:
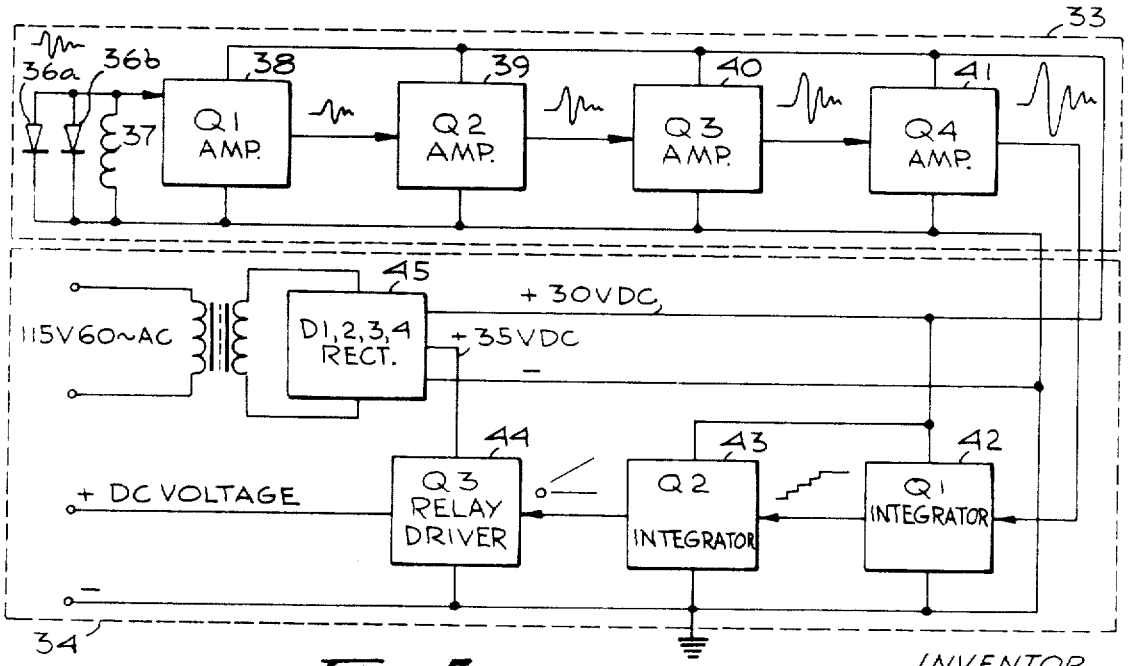
FIG. 5 is a block diagram that illustrates in greater detail both the detector-amplifier and the phase selector driver and power-supply units shown in FIG. 2.

The basic detector and phase selector driver units shown in FIG. 2 are broken down into somewhat greater detail by means of the block diagram of FIG. 5, the detector, however, being shown partially in schematic form. More particularly, the detector unit is shown to include a pair of photovoltaic detectors of the type having a fast response time, such as silicon detectors 36a and 36b, one cell for each direction of travel along a street, avenue or highway. The combination of the photovoltaic detector 36a and 36b and the inductance coil 37 constitutes a light sensitive communications receiver which is the subject of a copending U.S. patent application by the present inventor, Ser. No. 41,865, filed on June 1, 1970. Thus, for example, if a street lay in a North-South direction, one of the two cells would face North and the other one would face South. An inductance coil 37 is connected across or in parallel with the detector elements and combines with the capacitance of these cells to produce a resonant circuit that is tuned to a predetermined frequency, such as, for example, six kilocycles. Without the coil, a DC input, such as sunlight, could saturate the cells and thereby render them ineffective. Hence, inductance 37 acts as a DC short circuit in that it makes the detector circuit respond only to pulses of relatively sharp rise time. However, when such pulses of light do arrive, the detector circuit produces a corresponding number of pulsed electrical oscillations which are then successively amplified by series-connected amplifiers 38, 39, 40 and 41 which are also a part of the overall detector unit. The last amplifier in detector unit 33, namely, amplifier 41, is connected at its output end to a first integrator circuit 42 in power supply and phase selector driver unit 34, this first integrator circuit, in turn, being connected to a second integrator circuit 43. As can be seen from FIG. 5, integrator circuit 43 is connected to a relay driver circuit 44. The output end of the relay driver circuit 44. The output end of the relay driver circuit 44 is connected to phase elector control unit 35 which contains the relay network that operates the controller unit 11b. As may also be seen from FIG. 5, the circuits of units 33 and 34 receive their power from a conventional power supply network 45.

The function of the first and second integrator circuits is to produce a DC output voltage by integrating the train of pulses received from the amplifiers, the integration proceeding over a sufficient period of time to offset or eliminate false signals that may be present. By way of example, since it was previously indicated that the lamp assembly is preferably designed to produce about ten pulses per second, the integrators would then look at about twenty pulses in a two-second period and from it produce the desired output threshold voltage within one to two seconds. The output voltage from the first integrator 42 follows a step function, as may be expected, the integrator including a diode to clip the negative-going portion of the pulses being applied to it. Second integrator 43, on the other hand, takes this stepped signal out of the first integrator and further smoothes it to produce a substantially linearly rising DC voltage, the time rise of the integrators combined being such that the effects of false signals are thereby eliminated. As its name implies, relay driver 44 provides the power to drive or operate a relay network located in the phase selector control unit 35. Accordingly, whereas the integrators ultimately produce a rising voltage, the relay driver produces a rising output current that triggers or closes an input relay in the phase selector control unit 35 when the current reaches the input relay's threshold value.

It was mentioned earlier and for emphasis it is mentioned here again that the FIG. 5 apparatus only covers or takes care of the flow of traffic for a single street, avenue or highway, such as, for example, a North-South street at an intersection. Consequently, another such arrangement as is shown in FIG. 5 is required for the cross-street, such as the East-West street at the intersection. In short, four detector cells are needed at the usual right-angle street intersection, one for each direction, and each pair of oppositely directed detector cells is coupled into a FIG. 5 circuit arrangement, thereby making two such arrangements at each intersection. In the unusual event that emergency vehicles operating transmitters according to the present invention approach the intersection along both streets, then the one whose signals first arrive at the detector cells will assume and retain control of the situation.

Having discussed both detector and phase selector driver units 33 and 34, greater consideration is now given to phase selector control unit 35 which, it will be remembered, determines the condition of the traffic signals at the time the system goes into operation and if the signal in the desired direction is red, the controller 11b is shifted by the phase selector control from its automatic timing to manual timing. By so doing, the traffic signal cycling of the controller is placed directly under the command of the phase selector control unit which then advances the signal controller until a green light is given in the desired direction. The traffic signal light is held at green by the phase selector control unit until the vehicle on which the lamp is mounted has passed the intersection, at which time operation of the controller is returned to automatic. It should be noted that if the traffic signal is initially green rather than red, the controller is nevertheless transferred to manual and held in that condition until, as before, the emergency vehicle has passed through the intersection. It should further be noted that if controller 11b is synchronized with other controllers respectively located at other intersections, transferring to manual will not upset the synchronization when the unit is returned to automatic.

For safety purposes, namely, to prevent two emergency vehicles approaching the intersection from right-angle directions from using the system at the same time, an interlock arrangement is included in the phase selector control module as an inherent part of the network thereof. With this interlock arrangement, the first vehicle to trigger the system retains control of it or monopolizes it until it passes the intersection. If the second vehicle is still approaching, it will then take control in the manner already explained.

Figure 6:
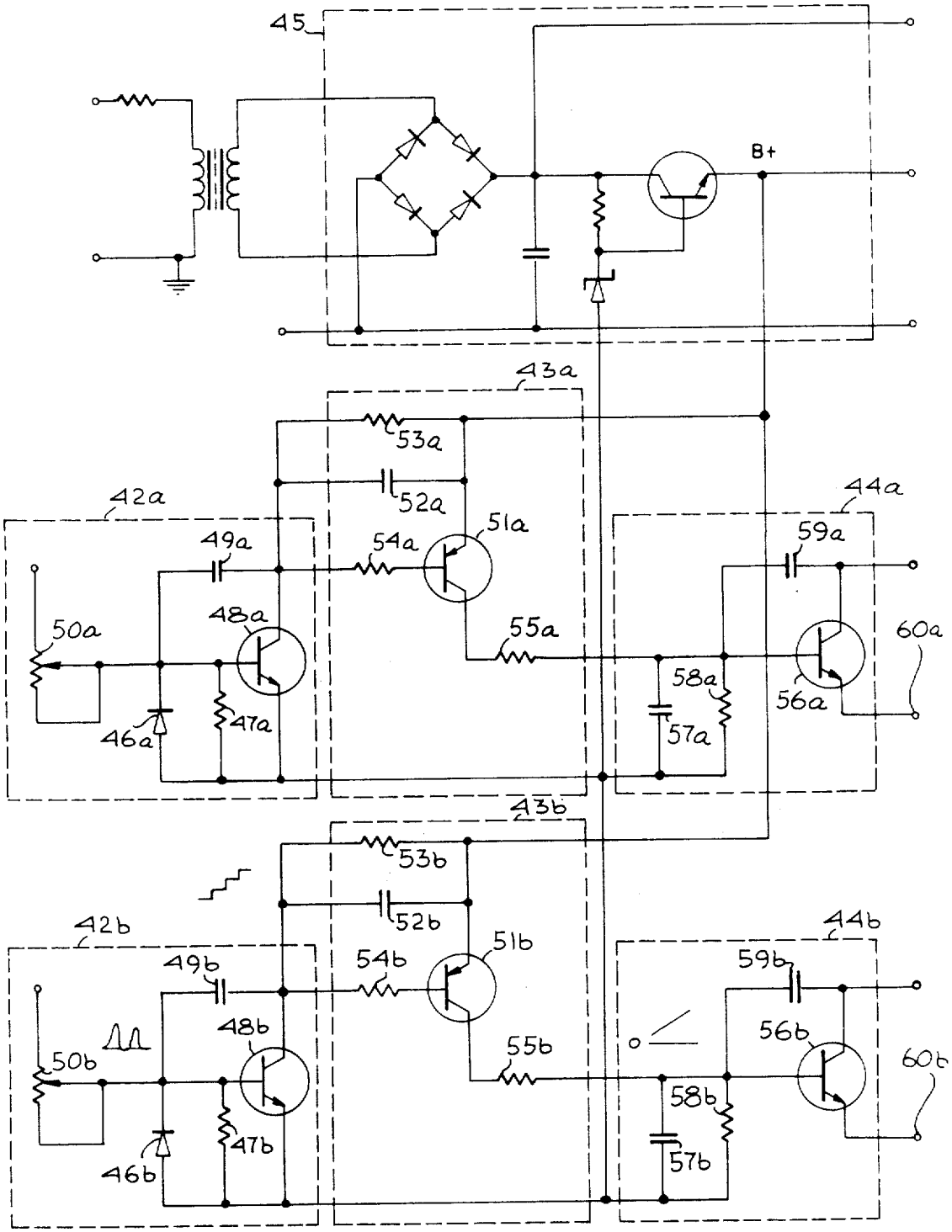
FIG. 6 is a [schmetic] *schematic* circuit diagram of the power supply and phase selector driver of FIG. 5 and is arranged to correspond therewith.

Power supply and phase selector driver unit 34 is shown in complete detail by means of the schematic diagram presented in FIG. 6 to which reference is now made, but it should be mentioned again in connection therewith and in accordance with the earlier discussion of the invention that two phase selector driver units and, therefore, two integrator channels are needed at an intersection each comprising first and second integrators and a relay driver, one such channel for each pair of detector cells covering the intersection. Stated differently, the phase selector driver arrangement in FIG. 5, comprising integrators 42 and 43 and relay driver 44, constitutes only one channel and is designed to take care of the signals received only at detector cells 36a and 36b. As was mentioned earlier, an identical channel is needed and used in connection with the signals received at the other pair of detector cells at an intersection and this is shown in the FIG. 6 illustration wherein both channels are included. Thus, in FIG. 6, the first integrator circuits are respectively designated 42a and 42b, the second integrator circuits are respectively designated 43a and 43b, and the relay driver circuits are respectively designated 44a and 44b. Furthermore, since the two channels are identical, to avoid being redundant and also to expedite matters, only one of these channels will be described hereinafter, namely, the channel including integrators 42a and 43a and relay driver 44a. Again, for sake of expediency, power supply 45 will not be described in any detail in view of the fact that it is not part of the invention and, additionally, is only a conventional type of power supply whose attributes are public knowledge.

As can be seen from FIG. 6, first integrator circuit 42a includes a diode 46a and a resistor 47a connected in parallel, the junction of the diode's anode and one end of the resistor being grounded and the junction of the diode's cathode and the other end of the resistor being connected to the base of a transistor designated 48a. A capacitor 49a is connected between the cathode of diode 46a and the collector of transistor 48A. The transistor's emitter is connected directly to ground. Finally, the circuit includes potentiometer 50a whose center tap is connected to the transistor base, one end of the potentiometer preferably being connected to the center tap and the other end of the potentiometer ultimately being connected, through one set of amplifiers 38–41 of the kind shown in FIG. 5 to one pair of detector cells 36a and 36b mounted at an intersection. Integrator circuit 42b being identical with integrator circuit 42a, the components of the former are designated in a like manner. As for second integrator circuit 43a, it includes a transistor 51a, a capacitor 52a, and three resistors respectively designated 53a, 54a and 55a. Capacitor 52a and resistor 53a are connected in parallel between the emitter element of transistor 51a and the collector element of transistor 48a, whereas resistor 54a is connected between the collector of transistor 48a and the base of transistor 51a. Resistor 55a on the other hand, is connected between the collector element of transistor 51a and relay driver 44a. As before, the corresponding components of second integrator circuit 43b are similarly designated. The last circuit in the channel being described is relay driver circuit 44a and it includes a transistor 56a whose base is connected to resistor 55a, a capacitor 57a and a resistor 58a connected in parallel between the same transistor base and ground, and a capacitor 59a that is connected between the collector and base elements of transistor 56a. The collector of the transistor 56a is connected through the phase selector control unit 35 to the source of B+ voltage. Finally, it should be noted that relay driver circuit 44a has an output terminal 60a that couples the emitter of transistor 56a to phase selector control unit 35. Needless to say the component parts of relay driver 44b have been given similar designations.

Considering now the operation of integrator circuits 42a and 43a and of relay driver circuit 44a, transistors 48a, 51a and 56a are biased so that they are initially inoperative in the sense that they are non-conducting. However, they are rendered operative or conducting when a train of RF pulses, previously referred to as pulsed electrical oscillations, is applied by the detector unit amplifiers to first integrator circuit 42a. More specifically, the RF pulses are applied through potentiometer 50a to the junction between diode 46a and capacitor 49a, the diode clipping the oscillations so as to substantially eliminate the negative-going portions thereof. Thus, each RF pulse in the train is subjected to the action of half-wave rectification, with the result that only the positive-going portions of each applied RF pulse appears at the input to capacitor 49a. In response thereto, the voltage across resistor 47a and, therefore, between the emitter and base of transistor 48a increases as a step-function, and when the bias on the transistor is overcome, it begins to conduct. When this happens, the voltage between the collector of transistor 48a and ground drops sharply which, in turn, correspondingly drops the voltage between the base of transistor 51a and ground, and when this occurs transistor 51a is thereby also rendered conducting.

Now, when the transistor 51a begins to conduct, the full B+ voltage applied to its emitter by voltage source 45 is applied through the transistor 51a to resistor 55a and capacitor 57a which then begins to charge toward this B+ voltage at a rate determined, primarily, by the RC time constant of resistor 55a and capacitor 57a. Stated differently, when transistor 51a begins to conduct, the voltage across capacitor 57a begins to increase fairly linearly toward B+ which it attains shortly thereafter. The B+ voltage may, for example, be 35 volts. Needless to say, as the voltage across capacitor 57a begins to rise, transistor 56a also begins to conduct, with the result that the linearly rising capacitor voltage also appears at the emitter of transtor 56a and, therefore, at the output terminal 60a that is connected to this emitter. Hence, the voltage across capacitor 57a is ultimately applied to phase selector control unit 35 which will shortly be taken up for detailed consideration.

Once the overall system has been put into operation, it is important for purposes of continuity in the control and operation of the traffic lights that transistor 56a remain conductive even though transistors 48a and 51a may momentarily be rendered nonconducting, which may occur because the flashing lamp on the emergency vehicle is momentarily obstructed or because the first RF pulses applied are too weak to maintain the transistors in a conducting state between pulses. More specifically, capacitor 49a does discharge somewhat between RF pulses and it may happen as a result thereof that, the voltage thereacross may drop to a value that is not sufficient to overcome the bias on transistor 48a. Under such circumstances, transistor 48a will be rendered non-conducting and so will transistors 51a and 56a which depend on transistor 48a for their operation. Accordingly, to prevent this from happening to transistor 56a, the time constant in the discharge path formed by capacitor 57a and resistor 58a, is made long enough so that if, for example, the flashing light source is interrupted by some obstruction and transistors 48a and 51a thereby rendered non-conducting, the discharge of capacitor 57a will be slow enough so as to keep transistor 56a in operation during this period of interruption and until transistors 48a and 51a are once again rendered conducting.

Having thus described the operation of integrator circuits 42a and 43a and also that of relay driver circuit 44a, it should, of course, be noted that the operation of integrator circuits 42b and 43b and that of relay driver circuit 44b is no different.

Figure 7:
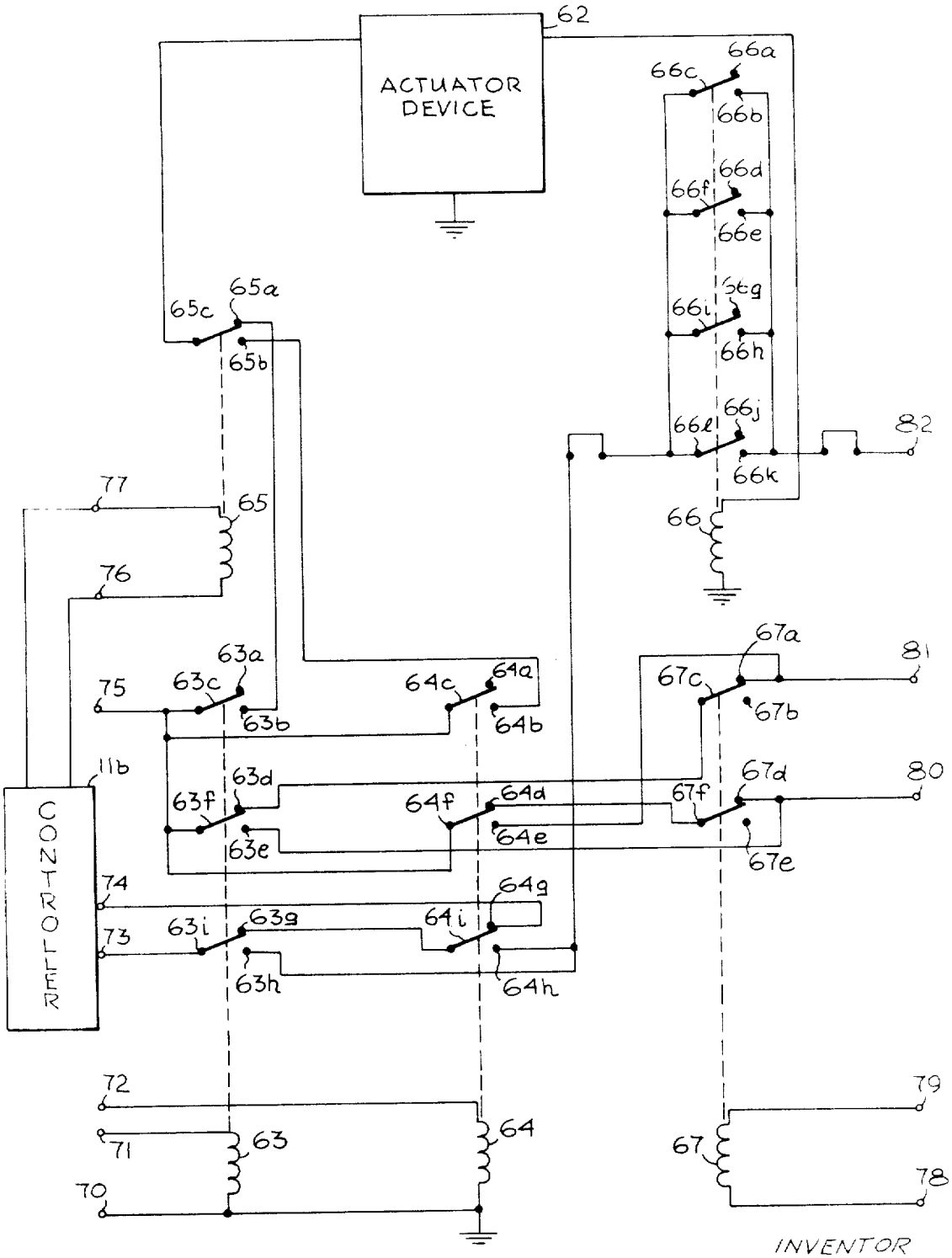
FIG. 7 is a [schmetic] *schematic* circuit diagram of the phase selector control unit shown in Block form in FIG. 2.

Reference is now made to FIG. 7 wherein the phase selector control unit is shown to include a relay actuator 62 and a plurality of five relays represented by their energizing coils which are respectively designated 63, 64, 65, 66 and 67. Relay actautor 62 is the kind of device that produces a series of electrical pulses in relatively rapid succession in response to the application thereto of a direct-current voltage and may be a transistorized type of switch circuit or a motor-driven cam-actuated switch. Both of these are well known and, therefore, a detailed showing and description of the actuator are not deemed necessary. As for the relays, input relay 63 comprises three sets of contacts and associated armatures, the contacts respectively being designated 63a, 63b, 63d, 63e, 63g, 63h, and the armatures associated therewith being designated 63c, 63f, and 63i. Input relay 64 similarly comprises three sets of contacts and associated armatures, the contacts respectively being designated 64a, 64b, 64d, 64e, 64g, 64h, and the armatures associated therewith being designated 64c, 64f, and 64i. With respect to relay 65, it requires only a single set of contacts 65a and 65b, the relay armature associated therewith being designated 65c. As for relay 66, it is shown to include four sets of contracts and armatures, the contacts respectively being designated 66a, 66b, 66d, 66e, 66g, 66h, 66j, 66k, and the armatures associated therewith respectively being designated 66c, 66f, 66i, and 66l. Finally, as may be seen from the figure, relay 67 includes only two sets of contacts and armatures, the contacts respectively being designated 67a, 67b, 67d, 67e, and the associated armatures respectively being designated 67c and 67f.

Returning now to relay 63, its energizing coil is connected between a grounded terminal 70 and a terminal 71 which is connected to that terminal 60a in FIG. 6 that is connected to the emitter of transistor 56a. Thus, it can be seen that the linearly rising voltage that appears across capacitor 57a, previously indicated as being applied through transistor 56a to phase selector control unit 35, is applied to terminal 71 and, therefore, is developed across coil 63. The same is true for relay 64 in that its energizing coil is connected between ground and a terminal 72 by means of which the coil is connected to receive, through transistor 56b in FIG. 6, the linearly rising voltage that may appear across capacitor 57b. Terminal 72 is connected to terminal 60b. The phase selector control unit also includes terminals 73–77, terminal 73 interconnecting armature 63i to a solenoid in controller 11b, terminal 74 interconnecting contact 64g to the controller's normal timing mechanism, terminal 75 being connected to apply the aforesaid B+ voltage to relay armatures 63c, 63f, 64c and 64f, and terminals 76 and 77 between which the energizing coil of relay 65 is connected, terminal 76 connecting one end of this coil to an alternating-current common or ground and terminal 77 connecting the other end of the coil to a terminal in controller 11b to which alternating-current power is applied when the red traffic signal light is lighted in an East-West direction or street. As may be seen from the figure, the phase selector control unit still further includes several terminals respectively designated 78–82, terminal 78 connecting one end of the energizing coil of relay 67 to the power source for the East-West amber traffic signal lights, terminal 79 connecting the other end of the same energizing coil to the power source for the North-South amber traffic signal lights, terminal 80 connecting relay contacts 63e and 67d to the collector of transistor 56a in FIG. 6, terminal 81 connecting relay contacts 64e and 67a to the collector of transistor 56b in FIG. 6, and terminal 82 connecting the alternating-current power in controller 11b to each of relay contacts 66b, 66e, 66h and 66k.

Considering now the connections between these terminals, relay contact 63b is shown to be connected to relay contact 65a and through armature 65c to relay actuator 62. Relay contact 63a, on the other hand, is connected through armature 63c to the B+ voltage source on terminal 75. Hence, this B+ voltage is applied to actuator 62 when armature 63c is brought into contact with contact 63b, unless the connection between contact 65a and armature 65c is broken. Contact 65b is also connected to contact 64b, and, therefore, the B+ voltage source applied to terminal 75 may alternatively be applied to actuator 62 by respectively bringing armatures 64c and 65c into contact with contacts 64b and 65b. Armature 64c is initially in contact with contact 64a, which is an open contact in the sense that it does not make connection to anything else in the circuit. As shown, armature 63f is initially in contact with contact 63d which, in turn, connects with armature 67c, and armature 67c is initially in contact with contact 67a which connects with contact 64e. Contact 63e, on the other hand, is connected to contact 67d and through armature 67f initially in contact therewith to contact 64d with which aramature 64f is initially in contact. Contacts 67b and 67e, however, are open contacts as previously defined. With respect to contacts 63g and 63h, contact 63g intially makes contact with armature 63i and through armature 64i with contact 64g, whereas contact 63h is connected to contact 64h as well as to armatures 66c, 66f, 66i and 66l which are connected in parallel. As shown in FIG. 7, these four armatures are initially respectively connected to contacts 66a, 66d, 66g and 66j, which do not connect to anything else in the circuit. However, the other four contacts in the relay, namely, contacts 66b, 66e, 66h and 66k, are connected in parallel and, as previously mentioned, they connect with terminal 82.

In considering the operation of phase selector control unit 35 as it is illustrated in FIG. 7, it will be assumed, first, that the traffic light signals at an intersection are red in the direction of the North-South street and, therefore, green in the direction of the East-West street, second, that an emergency vehicle equipped with transmitter apparatus according to the present invention is moving toward said intersection along the North-South street and, third, that circuits 42a, 43a and 44a in FIG. 6 handle or process signals received from a North-South street and that circuits 42b, 43b and 44b process signals received from the East-West street. In connection with these assumptions, two things should therefore be mentioned, first, that the description of the operation starts with the relay connections as they are shown in FIG. 7, and, second, that it will be the function of the phase selector control unit to affect controller 11b in such a manner as to quickly change the signals at the intersection so that a green traffic signal light will be produced along the North-South street and maintained in that condition until the vehicle passes through the intersection.

Accordingly, when, for the reasons previously explained, a linearly rising voltage is applied to the energizing coil of relay 63, relay 63 is actuated as soon as this voltage reaches the voltage level at which the relay is designed to be actuated, for example, 18 volts. When this occurs, relay armature 63i is moved into contact with contact 63h, thereby disconnecting the normal timing mechanism of controller 11b, to which terminal 74 is connected, from the controller solenoid, to which terminal 73 is connected, and connects this solenoid instead to the parallel combination of armatures 66c, 66f, 66i, and 66l. At the same time, armatures 63c and 63f are respectively moved into contact with contacts 3b and 63e, with the result, first, that the B+ voltage at terminal 75 is now applied to actuator device 62 and, second, that the same B+ voltage is thereby disconnected or removed from the collector of transistor 56b and applied instead of the collector of transistor 56a. Hence, with the actuation of relay 63, transistor 56b is deprived of B+ power, with the result that the channel made up of integrator circuits 42b, 43b and relay driver circuit 44b are, in effect, taken out of operation, thereby preventing an emergency vehicle traveling toward the intersection in an East-West direction from affecting the system, as has already been mentioned.

Considering the matter further, in response to the voltage applied thereto, actuator 62 produces a series of pulses which it applies to the coil of relay 66, and each of these pulses energizes the coil. Consequently, each pulse has the effect of momentarily moving armatures 66c, 66f, 66i, and 66l into contact with contacts 66b, 66e, 66h and 66k, and each time this happens, the alternating-current power applied to terminal 82 by controller 11b is in turn applied to the controller solenoid. It is thus seen that with the actuation of relay 63, a faster timing mechanism as determined by actuator 62 is substituted for the controller's normal timing mechanism, and that the solenoid in the controller is made to respond instead to this faster timing mechanism. In other words, while the controller's normal timing mechanism continues to function properly, it no longer has an effect on the solenoid at this time, with the result that the timing cycle in the controller is very greatly shortened. More specifically, each time the solenoid is pulsed, it advances the system toward a green light in the North-South direction, and since the solenoid is pulsed much more frequently now than it would be otherwise with the controller's normal timing mechanism in the network, the obtaining of a green light in said North-South direction is thereby greatly expedited.

It should be mentioned that with the traffic light changing from red to green in a North-South direction, the light in the East-West direction also changes from green to red, and that in doing so the light, in the latter instance, first goes from green to amber for a short period of time and then to red. As may be seen from the figure and from the previous discussion, when the lights are amber in an East-West direction, the East-West amber lamp power is applied to terminal 78 and from thence to the coil of relay 67 which is thereby energized. As a result thereof, armatures 67c and 67f respectively break contact with contacts 67a and 67d and make contact instead with contacts 67b and 67e. However, if the paths from terminal 75 to terminals 80 and 81 are traced, remembering that relay 63 is still energized, it will be seen that the energization of relay 67 has no present effect on the operation since the B+ voltage is still applied via terminal 80 to the collector of transistor 56a but not to terminal 81 to which the collector of transfer 56b is connected. Thus, as has been said, the transition from green to red during which the lights are amber in the East-West direction does not affect the expedited timing cycle as described above. Of course, when the lights subsequently change from amber to red, the power is then removed from the energizing coil of relay 67, with the result that armatures 67c and 67f respectively return to their former condition, namely, to their contact with contacts 67a and 67d.

With the traffic lights green in a North-South direction, as desired, and red in an East-West direction, terminal 77 receives a portion of the power supplied to the red lights. As a result, relay 65 is energized so that armature 65c therein breaks contact with contact 65a and instead moves into contact with contact 65b. Consequently, the electrical path between terminal 75 and actuator 62 is broken so that the B+ voltage on terminal 75 is then no longer applied to the actuator, which thereby ceases to produce pulses that actuate relay 66. Hence, the expedited actuation of the controller solenoid also ceases at this point, which means that the traffic lights remain in this state until the vehicle has passed through the intersection, at which time relay 63 is de-energized and controller 11b is thereby returned to its normal timing mechansim.

The operation described above is based on the assumption that initially the traffic lights are red in a North-South direection and green in an East-West direction. However, the lights may already be green in the North-South direction as the emergency vehicle approaches the intersection, and in this case, it would be the function of the computer control unit shown in FIG. 7 to maintain this state until the vehicle has passed through the intersection. More specifically, in this kind of situation where the lights are already green in the desired direction, both relays 63 and 65 are energized for the reasons already presented, namely, the rising voltage applied from transistor 56a to the energizing coil of relay 63 and the red light power applied to the energizing coil of relay 65. Accordingly, when this kind of situation exists, actuator 62 is deprived of the B+ voltage on terminal 75 and, as already explained above, both the controller's normal timing mechanism and the phase selector control unit's fast-acting timing mechanism are disconnected from the controller's solenoid whose operation is thereby held in abeyance until the vehicle and the flashing light signals thereon pass through the intersection. As before, relay 63 is de-energized and the solenoid in controller 11b is returned to normal timing control.

The entire description presented thus far has been determined by the assumption that it was necessary to provide a green light traffic signal in a North-South direction to accommodate an emergency vehicle traveling in that direction toward the intersection. However, it will be recognized that, except for minor differences, the operation of the system is the same to provide a green light for a vehicle traveling in an East-West direction. These differences are, first, that FIG. 6 circuits 42b, 43b and 44b are now involved in the operation rather than circuits 42a, 43a and 44a, and second, that it is relay 64 that is energized by the linearly rising voltage rather than relay 63. In all other respects, the network in FIG. 7 operates substantially as described. Perhaps it should also be mentioned that in this case the linearly rising voltage applied to the energizing coil of relay 64 appears at the emitter of transistor 56b whereas before, it will be remembered, it appeared at the emitter of transistor 56a and, further, that the collector of transistor 56a is now disconnected from the B+ voltage rather than the collector of transistor 56b. Aside from these few differences, the operation is the same, and it can therefore be seen that it would be unnecessarily redundant to go through it again.

It should finally be pointed out that instead of encountering a green or red light, a vehicle may encounter an amber light signal as it draws within transmitting range of the intersection. Since the amber signal is on for such a short time during the lighting cycle, and in addition, since the parameters or time constants of the receiver are such that time would actually be lost if the phase selector control unit 35 were to control the signal controller 11b at this time, the FIG. 7 network also includes means to prevent the phase selector control unit 35 from assuming such control under such conditions until the amber traffic light signal has run its normal or natural course. More specifically, if an amber light is on in either a North-South or an East-West direction, then a portion of the power supplied to the amber light is also supplied to the energizing coil of relay 67 via either terminal 78 or terminal 79, with the result that the coil is energized and armatures 67c and 67f break their respective contacts with contacts 67a and 67d. When this happens, the collectors of both transistors 56a and 56b are disconnected from their B+ voltage source, and with both of these transistors inoperative, a linearly rising voltage cannot be applied to either relay 63 or relay 64. However, with the conclusion of the amber signal, relay 67 returns to its normal state, which is the state shown in the figure, so that transistors 56a and 56b then receive power once again, and the system can now operate in one of the patterns previously described.

Having thus described the invention, what is claimed is:

1. Means for remotely controlling the type of traffic control system in which a signal controler controls a traffic light signaling operation, which remote control means comprise transmitting means mounted on an emergency vehicle for transmitting a predetermined signal indicating the approach of said emergency vehicle, detection means mounted at an intersection for directionally detecting said predetermined signal, and phase selection means operatively coupled to the detection means and for operative coupling to said signal controller for a traffic light at an intersection, which phase selection means include sensing means for operative coupling to the traffic light thereby sensing the phase of the traffic light, wherein the phase selection means, in response to the detection of said predetermined signal by the detection means, assumes control of said signal controller and, in response to both the detected direction of the detected predetermined signal and the sensed phase of the traffic light, causes said signal controller to operate in a selected phase.

2. Traffic system remote control means according to claim 1, wherein when upon initially responding to the detection of said predetermined signal, the phase selection means senses that an amber light is displayed by said traffic light on a street which intersects with the street of the approaching vehicle, the phase selection means is inhibited from assuming control of said signal controller until the end of the duration of said amber light.

3. Traffic system remote control means according to claim 1, wherein the phase selection means, in response to both the detected direction of the detected predetermined signal and the sensed phase of the traffic light, provides signals which cause the signal controller to control the traffic light signaling operation in a phase wherein a green light is displayed on the street of the approaching emergency vehicle and a red light is displayed on streets intersecting therewith.

4. Means for remotely controlling the type of traffic control system in which a signal controller either automatically controls a traffic light signaling operation in a predetermined phased cyclic sequence or is operable in a remote controlled mode, which remote control means comprise transmitting means mounted on an emergency vehicle for transmitting a predetermined signal indicating the approach of said emergency vehicle;

detection means mounted at an intersection for directionally detecting said predetermined signal; and phase selection means operatively coupled to the detection means and for operative coupling to a signal controller for a traffic light at an intersection, which phase selection means include sensing means for operative coupling to the traffic light thereby sensing the phase of the traffic light, wherein the phase selection means, in response to the detection of said predetermined signal by the detection means, assumes control of said signal controller and, in response to both the detected direction of the detected predetermined signal and the sensed phase of the traffic light, provides signals which cause said signal controller to control the traffic light signaling operation in a selected phase of the predetermined phased cyclic sequence.

5. Traffic system remote control means according to claim 4, wherein when upon initially responding to the detection of said predetermined signal, the phase selection means senses that a green light is not displayed by said traffic light on the street of said approaching vehicle, the phase selection means provides a series of signals at a predetermined rate to cause said signal controller to operate through its normal phase sequence at said predetermined rate until a green light is so displayed.

6. Means for remotely controlling the type of traffic control system in which a signal controller controls a traffic light signaling operation, which remote control means comprise transmitting means mounted on an emergency vehicle for transmitting a predetermined signal indicating the approach of said emergency vehicle, detection means mounted at an intersection for detecting said predetermined signal, and phase selection means operatively coupled to the detection means and for operative coupling to said signal controller for a traffic light at a said intersection, which phase selections, in response to the detection of said predetermined signal by the detection means, assumes control of said signal controller and causes said signal controller to operate in a selected phase, wherein the phase selection means include first means for providing a rising DC voltage output signal in response to the detection of said predetermined signal by the detection means; and second means operatively coupled to the first means for providing a signal which enables the phase selection means to assume control of the signal controller in response to said DC voltage output signal which rises by a sufficient amount over a predetermined period to exceed a threshold potential of the second means;

wherein means, which couple the second means to the detection means, have an R-C time constant of sufficient magnitude such that once the phase selection means assume said control of said signal controller, the second means continue to provide said output signal for enabling the phase selection means to retain said control for at least a predetermined duration following an interruption in receipt of said predetermined signal by the detection means.

7. Means for remotely controlling the type of traffic control system in which a signal controller controls a traffic light signaling operation, which remote control means comprise transmitting means mounted on an emergency vehicle for transmitting a predetermined signal indicating the approach of said emergency vehicle, wherein the transmitting means provide a predetermined signal made up of a train of pulses;

detection means mounted at an intersection for detecting said predetermined signal, whereby the detection means provide a pulse train upon receipt of said predetermined signal; and phase selection means operatively coupled to the detection means and for operative coupling to said signal controller for a traffic light at a said intersection, which phase selection means, in response to the detection of said predetermined signal by the detection means, assumes control of said signal controller and causes said signal controller to operate in a selected phase, wherein the phase selection means comprise integrating means for providing a rising DC output voltage in response to said pulse train from the detection means; and relay driver means for providing a signal which enables the phase selection means to assume control of said signal controller, which relay driver means is responsive to a signal from said integrating means which rises by a sufficient amount over a predetermined period of time to exceed a threshold potential of the relay driver means;

whereby the relay driver means is non-responsive to receipt by the detection means of a false signal having less than a predetermined number of pulses over a predetermined period of time.

8. Traffic system remote control means according to claim 7, wherein the integrating means include a first integrating circuit for providing a step function signal in response to said pulse train received from the detection means and a second circuit for producing a substantially linearly rising DC voltage in response to the step function signal received from the first integrating circuit.

9. Traffic system remote control means according to claim 7, wherein means which couple the relay driver to the detection means have an R-C time constant of sufficient magnitude such that once the phase selection means assume said control of said signal controller, the driver means continue to provide said signal for enabling the phase selection means to retain said control for at least a predetermined duration following an interruption in the receipt of said predetermined signal by the detection means.

10. Means for remotely controlling the type of traffic control system in which a signal controller controls a traffic light signaling operation, which remote control means comprise transmitting means mounted on an emergency vehicle for transmitting a predetermined signal indicating the approach of said emergency vehicle, detection means mounted at an intersection for detecting said predetermined signal, and phase selection means operatively coupled to the detection means and for operative coupling to said signal controller for a traffic light at a said intersection, which phase selection means, in response to the detection of said predetermined signal by the detection means, assumes control of said signal controller and causes said signal controller to operate in a selected phase, wherein at said intersection there is at least one detection means for each intersecting street for detecting the approach of a said emergency vehicle on each street separately; and the phase selection means comprise control means for sensing the phase in which said signal controller is operating and for providing signals for assuming control of said signal controller; and driver means for each detection means and responsive thereto for providing power to the control means for operation thereof;

wherein the control means upon receiving power from one of the driver means inhibits, for the duration of receipt of such power, the other driver means from providing power to the control means;

whereby when the approach of emergency vehicles on intersecting streets is detected, the phase selection means causes said signal controller to control the traffic light signaling operation in a phase wherein a green light is displayed on the street upon which the approach of a said emergency vehicle is first detected, and a red light is displayed on the streets intersecting therewith.

11. Means for remotely controlling the type of traffic control system in which a signal controller controls a traffic light signaling operation, which remote control means comprise transmitting means mounted on an emergency vehicle for transmitting a predetermined signal indicating the approach of said emergency vehicle, detection means mounted at an intersection for detecting said predetermined signal, and phase selection means operatively coupled to the detection means and for operative coupling to said signal controller for a traffic light at a said intersection, which phase selection means, in response to the detection of said predetermined signal by the detection means, assumes control of said signal controller and causes said signal controller to operate in a selected phase, wherein said predetermined signal is a predetermined light communication signal having pulses of relatively sharp rise time and of a predetermined frequency, and wherein the detection means comprise a light sensitive communications receiver which is capable of distinguishing said predetermined light communication signal from steady state ambient light of comparable intensity, which light sensitive communications receiver comprises a photovoltaic detector having a fast response time; and an inductance coil connected in parallel with the photovoltaic detector, the inductance value thereof being such in relation to the capacitance of the photovoltaic detector that the parallel combination of the inductance coil and the photovoltaic detector provides a resonant circuit which produces an electrical signal responsive to said predetermined light communication signal;

wherein, in the absence of the receipt of a sharply varying light pulse by the photovoltaic detector, the inductance coil acts as a DC short circuit.

12. Traffic system remote control means according to claim 11, wherein the photovoltaic detector having a fast rise time is a photovoltaic silicon detector.

13. Means for remotely controlling a traffic control system comprising transmitting means mounted on an emergency vehicle for transmitting a predetermined light communication signal indicating the approach of said emergency vehicle, wherein said predetermined light communication signal has pulses of relatively sharp rise time and of a predetermined frequency;

detection means mounted at an intersection for detecting said predetermined signal; and selection means mounted at an intersection for controlling a traffic light signaling operation in response to the receipt of said predetermined signal by the detection means;

wherein the detection means comprise a light sensitive communications receiver which is capable of distinguishing said predetermined light communication signal from steady state ambient light of comparable intensity, which light sensitive communications receiver comprises a photovoltaic detector having a fast response time; and an inductance coil connected in parallel with the photovoltaic detector, the inductance value thereof being such in relation to the capacitance of the photovoltaic detector that the parallel combination of the inductance coil and the photovoltaic detector provides a resonant circuit which produces an electrical signal responsive to said predetermined light communication signal;

wherein, in the absence of the receipt of a sharply varying light pulse by the photovoltaic detector, the inductance coil acts as a DC short circuit.

14. Traffic system remote control means according to claim 13, wherein the photovoltaic detector having a fast rise time is a photovoltaic silicon detector.

*15. Means for remotely controlling a traffic control system comprising*

*transmiting means mounted on an emergency vehicle for transmitting a predetermined light communication signal indicating the approach of said emergency vehicle, wherein said predetermined light communication signal has pulses of relatively sharp rise time and of a predetermined frequency;*

*detection means mounted at an intersection for detecting said predetermined signal; and*

*selection means mounted at an intersection for controlling a traffic light signaling operation in response to the receipt of said predetermined signal by the detection means;*

*wherein the transmitting means comprise*

*a chamber having a light-transmissive wall;*

*an electronic flash lamp mounted in said chamber having electrical conductors adapted to be connected to be energized; and*

*a light-transmissive electrically-insulating fluid in said chamber to contact said electrical conductors of said electronic flash lamp, and*

*wherein the detection means comprise*

*a light sensitive communications receiver which is capable of distinguishing said predetermined light communication signal from steady state ambient light of comparable intensity, which light sensitive communications receiver comprises*

*a photovoltaic detector having a fast response time; and*

*an inductance coil connected in parallel with the photovoltaic detector, the inductance value thereof being such in relation to the capacitance of the photovoltaic detector that the parallel combination of the inductance coil and the*

*photovoltaic detector provides a resonant circuit which produces an electrical signal responsive to said predetermined light communication signal;*

*wherein, in the absence of the receipt of a sharply varying light pulse by the photovoltaic detector, the inductance coil acts as a DC short circuit.*

*16. Traffic system remote control means according to claim 15, wherein the photovoltaic detector having a fast rise time is a photovoltaic silicon detector.*

References Cited

The following references, cited by the Examiner, are of record in the patented file of this patent or the original patent.

UNITED STATES PATENTS

| | | | |
|---|---|---|---|
| 3,278,895 | 10/1966 | Pfund | 340—34 |
| 3,257,641 | 6/1966 | Campana et al. | 340—33 |
| 3,247,482 | 4/1966 | Lesher | 340—32 |
| 3,209,325 | 9/1965 | Mentzer et al. | 340—33 |
| 3,114,127 | 12/1963 | Ramsey | 340—32 |
| 2,903,674 | 9/1959 | Schwab | 340—33 |
| 2,881,409 | 4/1959 | Cook et al. | 340—33 |
| 2,457,502 | 12/1948 | Shepherd | 340—32 |
| 2,355,607 | 8/1944 | Shepherd | 340—33 |
| 2,203,871 | 6/1940 | Koch | 340—33 |
| 2,936,387 | 5/1960 | Steele, Jr. et al. | 313—22 |

OTHER REFERENCES

J. W. Verbeck, "Optics Operate Signals in Emergencies," March 1967, The American City, pp. 125 and 128.

KATHLEEN H. CLAFFY, Primary Examiner

R. P. MYERS, Assistant Examiner